(No Model.)
J. E. ZIMMERMAN.
SANITARY CLOSET.
No. 585,637.  Patented June 29, 1897.
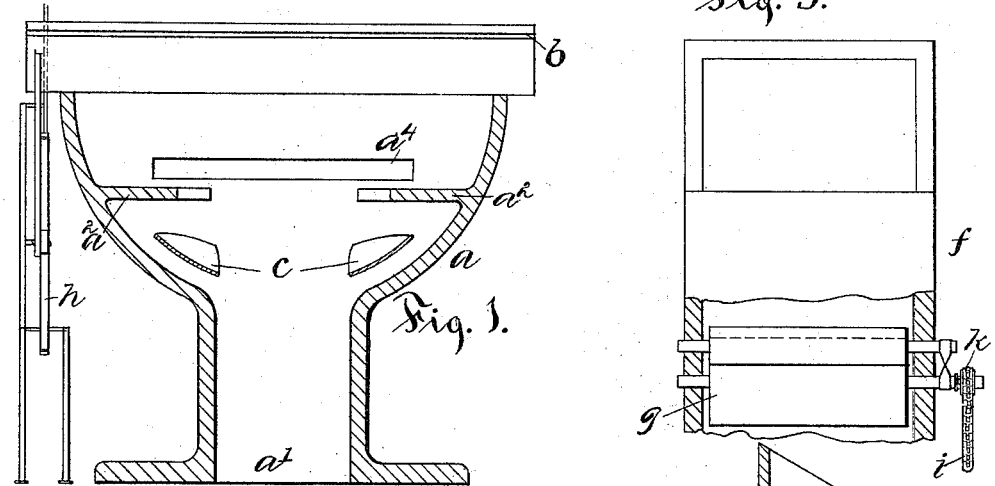
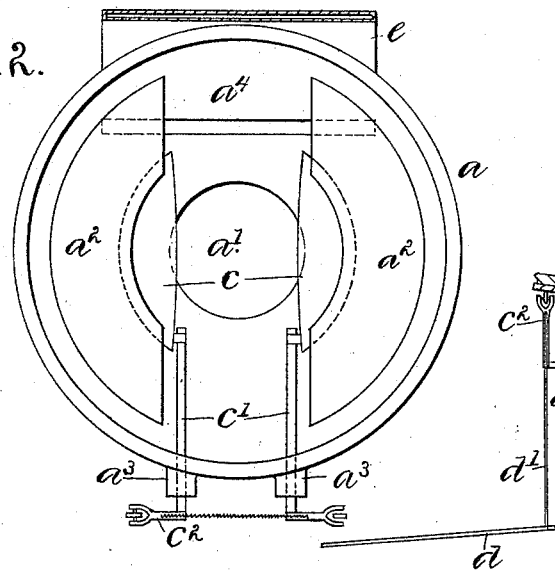
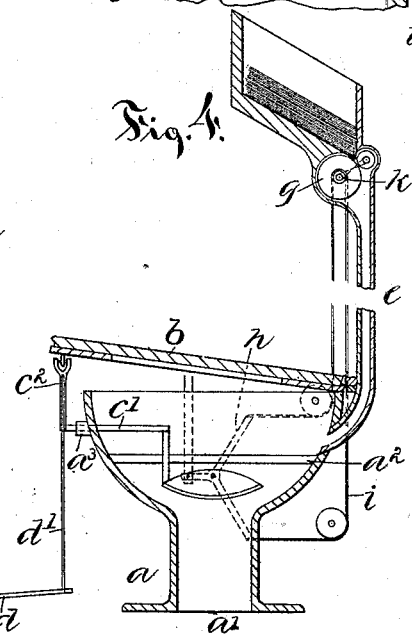
Witnesses.
Harris E. Hart.
Arthur B. Jenkins
Inventor.
Joseph E. Zimmerman
by Chas. L. Burdett,
Attorney.
THE NORRIS PETERS CO., PHOTO-LITHO., WASHINGTON, D. C.

UNITED STATES PATENT OFFICE.

JOSEPH E. ZIMMERMAN, OF HARTFORD, CONNECTICUT, ASSIGNOR OF ONE-HALF TO PHILIP ZIMMERMANN, OF SAME PLACE.

SANITARY CLOSET.

SPECIFICATION forming part of Letters Patent No. 585,637, dated June 29, 1897.

Application filed June 17, 1896. Serial No. 595,849. (No model.)

*To all whom it may concern:*

Be it known that I, JOSEPH E. ZIMMERMAN, a citizen of the United States, and a resident of Hartford, in the county of Hartford and State of Connecticut, have invented certain new and useful Improvements in Sanitary Closets, of which the following is a full, clear, and exact description, whereby any one skilled in the art can make and use the same.

The object of my invention is to provide a sanitary closet which shall be particularly adapted for use on railway-cars, at railway-stations, or in places where it is liable to be used by persons who ordinarily take but little care of such an apparatus.

The improvement involves the use, in connection with the closet, of means of providing a piece of paper, serving as a shield for the pan and for dumping the contents from the pan in the ordinary manner, as by an opening movement of the pan.

To this end my invention consists in the details of the several parts making up the apparatus as a whole and in the combination of the several parts, as more particularly hereinafter described, and pointed out in the claims.

Referring to the drawings, Figure 1 is a view looking from the front and in central vertical section of the device. Fig. 2 is a top or plan view of the bowl with the chute cut in section and with the pan-operating mechanism removed. Fig. 3 is a detail view, partly in section, looking from the rear into the reservoir and showing the feed-rollers. Fig. 4 is a detail side view, on reduced scale in central section, through the device. Fig. 5 is a detail view showing the sprocket-wheel.

In the accompanying drawings, the letter $a$ denotes the bowl of a closet, preferably made from porcelain or like material and having an outlet-opening $a'$ through the bottom and provided with lateral ribs $a^2$, projecting from the inside walls toward the center of the bowl. A cover or seat $b$ is hinged to the bowl in the usual manner. Lugs $a^3$ are formed on the outside of the bowl, through which the shafts $c'$ of the swinging pans $c$ extend. These pans are two in number, underlying the ribs $a^2$, and at the downward limit of movement are brought close together, the shaft $c'$ having on its outer end a crank-arm $c^2$, located in the path of movement of the swinging seat. This seat is preferably held with a yielding force in a raised position. A hinged platform $d$ is pivoted to the floor in front of the bowl and is connected to the crank-arm, as by means of a connecting-rod $d'$. By these mechanisms the weight of a person upon the platform or seat causes the pans to be swung together, and when the weight is removed the pans are swung apart, suitable devices being provided to hold the pans in an opened position with regard to each other.

A delivery-opening $a^4$ is formed through the rear wall of the bowl, leading to a chute $e$, extending upward to a box or reservoir $f$, in which are located in layers sheets of paper cut to the required size.

A feed-roller $g$, provided on its periphery with suitable frictional grasping means, as a covering of rubber, for engaging the pile of paper to withdraw the bottom sheet, is located in position to engage said pile of paper located in the box, and as the roller is revolved by the mechanism hereinafter described the lower sheet of paper in the pile is drawn therefrom and delivered to the chute $e$, through which it falls into the bowl $a$, with the edges of the paper resting on the lateral ribs on each side of the bowl and overlying the pans $c$.

A pivoted lever $h$ is located near or attached to the bowl and is, by a system of levers connected therewith, adapted to be operated by a downward movement of the seat $b$ or platform $d$. A sprocket-chain $i$ is connected at one end to one end of said lever and at the other end to the opposite end of the lever, the chain passing around a sprocket-wheel $k$, mounted on the shaft of the feed-roller $g$. Pawls $k'$ are pivoted on the ratchet-wheel and are held normally in engagement with ratchet-teeth located on the shaft of the roller $g$. The sprocket-wheel is free to rotate in one direction independent of the shaft, but by means of the pawls engaging the ratchet-teeth the shaft is compelled to rotate with the ratchet-wheel in the opposite direction. The ratchet-wheel is rotated in one direction by the movement of the sprocket-chain through the movement of the swinging seat by the operation of the system of levers, and is rotated in the opposite direction as by means of a spring or equivalent device.

The operation of the device is as follows: A weight placed upon the seat or platform causes the sprocket-wheel, through the system of levers and sprocket-chain, to be rotated, which operation draws a piece of paper from the bottom of the pile in the reservoir and delivering it to the chute $e$, through which it falls and by which it is delivered into the bowl $a$, with its side edges resting on the ribs $a^2$ of the bowl. The same weight on the seat or platform has caused the pans $c$, through the medium of the levers, to be swung together, underlying the sheet of paper and in position to support it. A weight placed upon the sheet of paper causes it to sag until it rests on the pans, and when the weight is removed from the seat or platform the pans swing apart and allow the paper to fall through the outlet-opening in the bottom of the bowl. By means of the springs the seat is raised and the ratchet mechanism returned to its former position in readiness for a repetition of the operation.

I claim as my invention—

1. In combination with the bowl of a closet, a separable support mounted therein, mechanism for causing a separation of the support, a reservoir for a pile of paper in sheets, and mechanism for withdrawing a single sheet of paper from the pile in the reservoir and delivering it onto the separable support in the bowl, all substantially as described.

2. In combination with the bowl of a closet, a separable support mounted therein, mechanism for causing the separation of the support, a reservoir for a pile of paper in sheets, mechanism for withdrawing the single sheet of paper from the pile in the reservoir and delivering it onto the separable support, and means for operating the delivery mechanism through the medium of a compulsory movement of a part of the apparatus, all substantially as described.

3. In combination with the bowl of a closet, a separable support mounted therein, a reservoir for a pile of paper in sheets, mechanism for withdrawing a single sheet of paper from the pile in the reservoir and delivering it onto the separable support in the bowl, and means for simultaneously operating the delivery mechanism and separating mechanism for the support through the medium of a compulsory movement of a part of the apparatus, all substantially as described.

4. In combination with the bowl of a closet, a separable support mounted therein, mechanism for causing the separation of the support through the medium of a compulsory movement of a part of the apparatus, a reservoir for a pile of paper in sheets, and mechanism for withdrawing a single sheet of paper from the pile in the reservoir and delivering it onto the separable support, all substantially as described.

5. In combination with the bowl of a closet, a separable support mounted on a bell-crank lever operatively connected with a swinging part of the apparatus, a reservoir for a pile of paper in sheets, and mechanism for withdrawing a single sheet of paper from the pile in the reservoir and delivering it onto the separable support in the bowl, all substantially as described.

6. In combination with the bowl of a closet, a separable support mounted therein, means for causing the separation of the support, a reservoir for paper in sheets, a roll mounted in the bottom of the reservoir and with its periphery provided with means for grasping the paper and in engagement with the bottom of the pile supported in the reservoir, a ratchet-and-pawl mechanism mounted on the axis of the roll to cause it to revolve in one direction, and a system of levers connected with the ratchet mechanism and operated by the compulsory movement of the apparatus, and a chute through which the paper is delivered onto the separable support, all substantially as described.

7. In combination with the bowl of a closet, a separable support mounted therein, means for causing the separation of the support, a reservoir for paper in sheets, a friction-roll mounted with its periphery in contact with the bottom of the pile of paper in the reservoir, a sprocket-wheel mounted on the axis of the roll, a ratchet-wheel secured to the roll, pawls mounted on the sprocket-wheel and in engagement with the ratchet-wheel, a swinging lever connected at each end with an end of a chain passing around the sprocket-wheel, and means for swinging the lever through the medium of a compulsory movement of a swinging part of the apparatus, all substantially as described.

8. In combination with a receiver, a separable support mounted therein, mechanism for causing a separation of the support, a reservoir for a number of sheets of paper and located above the receiver, a conductor leading from the reservoir to the receiver, mechanism for withdrawing a single sheet of paper from the receiver and delivering it into the conductor.

JOSEPH E. ZIMMERMAN.

Witnesses:
ARTHUR B. JENKINS,
PH. ZIMMERMANN.